United States Patent [19]
Bechthold et al.

[11] Patent Number: 5,336,470
[45] Date of Patent: * Aug. 9, 1994

[54] CHEMICAL OXYGEN GENERATOR HAVING A MULTI-COMPONENT REACTION-CONTROL MEMBER

[75] Inventors: Hans-Christoph Bechthold, Hamburg; Udo Burchardt, Gross Grönau; Rainer Ernst, Curau; Karsten Vogeler, Brunsbek, all of Fed. Rep. of Germany

[73] Assignee: Drägerwerk Aktiengesellschaft, Lübeck, Fed. Rep. of Germany

[*] Notice: The portion of the term of this patent subsequent to Jun. 21, 2011 has been disclaimed.

[21] Appl. No.: 994,332

[22] Filed: Dec. 21, 1992

[30] Foreign Application Priority Data

Dec. 21, 1991 [DE] Fed. Rep. of Germany ....... 4142504

[51] Int. Cl.$^5$ .............................................. A62B 7/08
[52] U.S. Cl. .................................... 422/120; 422/165; 422/305; 422/164
[58] Field of Search ............... 422/120, 165, 305, 220, 422/271, 171, 177, 211, 164; 423/579

[56] References Cited

U.S. PATENT DOCUMENTS

| | | | |
|---|---|---|---|
| 1,834,577 | 12/1931 | Cline | 422/271 |
| 3,796,002 | 3/1974 | Katsuda | 422/305 |
| 4,171,340 | 10/1979 | Nishimura et al. | 422/305 |
| 4,197,213 | 4/1980 | Pietz et al. | 422/120 |
| 4,241,485 | 12/1980 | McBride | 422/120 |
| 4,318,894 | 3/1982 | Hensel et al. | 422/220 |
| 4,726,105 | 2/1988 | Yamanaka et al. | 422/177 |
| 4,728,503 | 3/1988 | Iida et al. | 422/177 |
| 4,981,655 | 1/1991 | Kolbe et al. | 422/120 |

FOREIGN PATENT DOCUMENTS

| | | |
|---|---|---|
| 139956 | 8/1930 | Switzerland . |
| 180448 | 1/1936 | Switzerland . |
| 183336 | 6/1936 | Switzerland . |

Primary Examiner—Robert J. Warden
Assistant Examiner—Hien Tran
Attorney, Agent, or Firm—Walter Ottesen

[57] ABSTRACT

The invention relates to a chemical oxygen generator having a chemical charge arranged within a housing. This chemical charge is brought to an exothermal oxygen-releasing reaction by an ignition device with the reaction running through the chemical charge in the form of a reaction front defining a surface and starting from the ignition-end wall of the housing. The oxygen generator has at least one reaction-control member arranged within the chemical charge. In one embodiment, the reaction-control member is disposed transversely to the direction of movement of the reaction front and overlaps a part of the surface of the reaction front. In another embodiment, the reaction-control member extends parallelly to the direction of movement of the reaction front. The oxygen generator of the invention is improved in that the oxygen flow and the duration of supply can be influenced beyond that obtained with a purely geometric extension of the reaction path. The improvement is obtained in that the reaction-control members are configured to have a thermally-insulating layer and at least one good thermally-conducting layer.

14 Claims, 4 Drawing Sheets

CHEMICAL OXYGEN GENERATOR HAVING A MULTI-COMPONENT REACTION-CONTROL MEMBER

FIELD OF THE INVENTION

The invention relates to a chemical oxygen generator having a chemical charge arranged within a housing which is brought to an exothermal oxygen-releasing reaction. The reaction is in the form of a reaction front defining a surface which moves through the chemical charge from a wall of the housing at which an ignition device is mounted. The oxygen generator has at least one reaction-control member arranged within the chemical charge with the reaction-control member being mounted so as to extend transversely to the direction of movement of the reaction front. The reaction-control member overlaps a portion of the surface of time reaction front or extends parallelly to the direction of movement of the reaction front.

BACKGROUND OF THE INVENTION

Chemical oxygen generators include a cartridge containing a chemical charge and have a starting device at one end of the cartridge. The starting device is in the form of an ignition device and an oxygen outlet is provided in the end of the cartridge lying opposite the ignition device. After activating the ignition device, the chemical charge releases oxygen in an exothermal reaction with the oxygen leaving the cartridge through the oxygen outlet. The chemical charge can, for example, be sodium chlorate with additives. The reaction front runs from the ignition device to the oxygen outlet. The oxygen quantity (the oxygen flow) supplied per unit of time and the time duration of this supply are dependent upon the geometry of the chemical charge and the formulation of this charge. Furthermore, flow and supply duration can be influenced by the reaction-control members.

Swiss Patent 139,956 discloses an oxygen generator wherein the chemical charge is provided with a slit starting at the ignition end and running parallelly to the reaction front and into the region of the opposite-lying end. An insulating plate is inserted into the slit as a partition element which prevents the reaction from jumping over to the other side. The chemical charge reacts first only on one side of the insulating plate when the chemical charge is ignited. The reaction front runs to the opposite lying end and here jumps over to the other side of the insulating plate and, on this side, runs back to the ignition end. In this way, approximately twice the running time with half the flow of the generator is obtained compared with an embodiment without the partition element.

It is a disadvantage in this generator that the flow and supply duration cannot be influenced beyond the strictly geometric doubling of the reaction path.

Swiss Patent 183,336 discloses a chemical oxygen generator which is partitioned into segments by partition walls extending in the longitudinal direction. However, no information is provided as to the material of the partition walls and the function thereof. The description however permits the assumption to be made that the partition walls are made of paraffinated asbestos board.

Swiss Patent 180,448 discloses a generator having component partition walls made of asbestos or metal coated with paraffin. These walls are arranged transversely to the direction of movement of the reaction front. The walls uniformly distribute the gas flowing through the generator. The paraffin coating is apparently provided only as a protection against corrosion.

The two last-mentioned patents provide no suggestion as to how the flow and running time of a generator can be influenced with built-in walls.

SUMMARY OF THE INVENTION

In view of the foregoing, it is an object of the invention to provide a chemical oxygen generator of the kind described above which is improved so that the oxygen flow and the supply duration can be influenced beyond a purely geometric extension of the reaction path.

According to a feature of the invention, the reaction-control member is made of a thermally-insulating layer and at least one good thermally-conductive layer.

It is an advantage of the invention that the oxygen flow and the supply duration can be influenced within wide limits by the selection of different materials and material thicknesses as well as by means of the number and arrangement of the reaction-control members. The oxygen flow can also be adapted to a pregiven profile.

The good thermally-conductive layer of the reaction-control member draws heat away from the reaction front and therefore slows the reaction. This takes place, on the one hand, in that the material itself absorbs heat and, on the other hand, in that the material conducts heat away to the generator housing and through the housing to the ambient. The type of material and the thickness of the sheet metal influence the quantity of heat conducted away. The thermally-insulating layer prevents heat from being conducted into that portion of the chemical charge lying rearward of the reaction-control member and thereby also acts to slow the reaction. The oxygen flow drops and the duration of supply increases by the slowing of the reaction.

According to another feature of the invention, the reaction-control member can be provided in a sandwich configuration made of good thermally-conducting layers and a thermally-insulating layer disposed therebetween. With this embodiment, the heat absorption and removal effect occurs at both sides and the reaction-control member has a still greater reaction-slowing effect.

Sheets made of metal such as high-grade steel, brass and copper can be used as good thermally-conducting layers. The following materials can be used for the thermally-insulating layer: plates, fiber plates, nonwoven formed fabrics or foamed bodies made of glass, ceramic or other inorganic materials. If the sheets applied on one side or both sides of the insulating layer are provided with a plurality of holes, then the released oxygen can penetrate into the insulating layer and, as a consequence thereof, dust occurring during the reaction can deposit on the insulating layer. The reaction-control member thereby additionally acts as a dust filter.

The control members can be built into the interior of the generator housing in such a manner that they are transverse to the running direction of the reaction front and so that these members partially overlap the surface of the reaction front. With this configuration, the speed of the reaction is slowed at each reaction-control member. The reaction front is diverted in its running direction at each reaction-control member when the surfaces covered by the reaction-control members mounted one behind the other are arranged so as to be displaced with respect to each other. In this way, a zigzag-shaped path of the reaction front is obtained which is longer than a straight path. In this way, the supply duration of the generator is still further extended.

Reaction-control members can be arranged parallelly to the running direction of the reaction front over the entire reaction path or over portions thereof. The reaction-control elements draw heat away from the reaction front and thereby slow the reaction and increase the duration of supply of the generator.

According to another feature of the invention, a reaction-control member can be so built in that it extends from a housing wall segment, which lies parallelly to the running direction of the reaction front, to an opposite-lying housing wall segment and so that the reaction-control member reaches from the ignition-end housing wall up to the region close to the wall lying opposite in the running direction of the reaction front. In this way, a U-shaped path is provided in the reaction front. In addition to almost doubling the path of the reaction front, a slowing influence of the reaction-control member is obtained so that the supply duration of the generator compared to a generator without built-in members is more than doubled.

The supply duration can be more than tripled with two reaction-control members.

According to another embodiment of the invention, the reaction-control member can have a helical shape and be in the form of a spiral conveyor which forms a helically-shaped path for the reaction front. On the other hand, the oxygen generator can have a housing in the form of a worm casing which produces a spirally-wound path for the reaction front. The supply duration is again significantly lengthened with both these embodiments.

All reaction-control members can also be configured as simple sheet metal or as a simple insulated layer. The lengthening of the supply duration is then less than that obtained with a reaction-control member configured from sheet metal and an insulating layer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
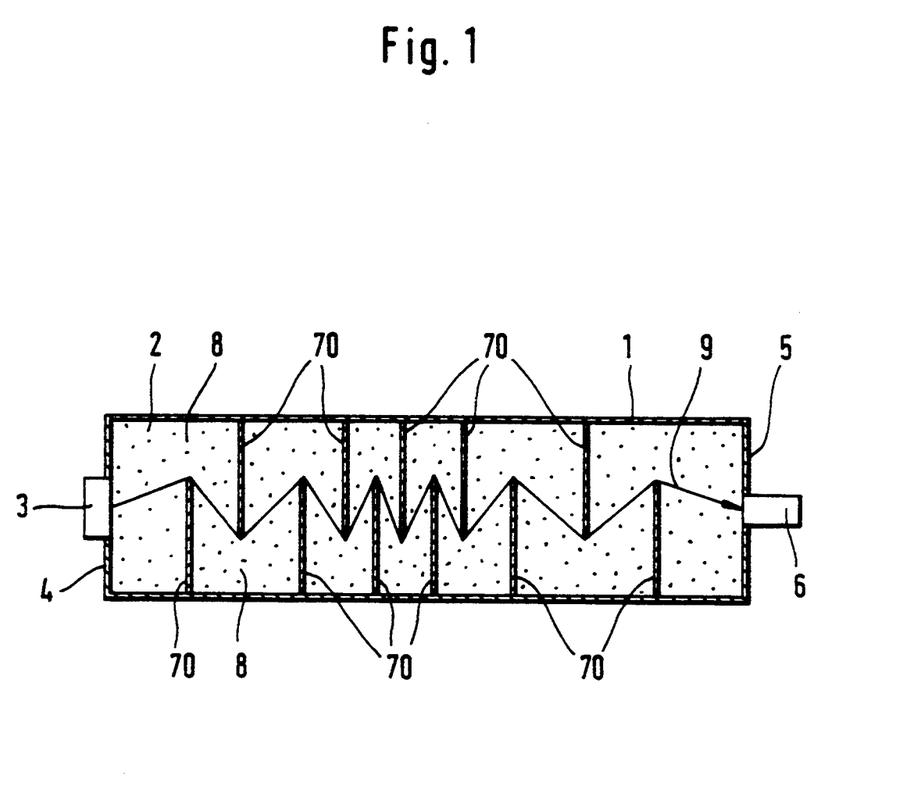
FIG. 1 is a side elevation view, in section, of a chemical oxygen generator according to the invention and containing a plurality of reaction-control members built in so as to be transverse to the direction of movement of the reaction front.

The chemical oxygen generator of FIG. 1 includes a cylindrical housing 1 wherein a chemical charge 2 is disposed which can be brought to reaction by means of an ignition device 3. The reaction runs from the ignition end 4 of the housing 1 to the opposite-lying end 5 with an outlet 6 being provided at the end 5 for passing the released oxygen from the housing.

A plurality of reaction-control members 70 are arranged within the chemical charge 2 so as to be transverse to the direction of movement of the reaction. The reaction-control members 70 have the shape of sectors of a circle with the circle diameter corresponding to the inner diameter of the housing 1. The reaction-control members thereby seal the cross-sectional area of the housing 1 at their periphery and leave a pass-through 8 free for the reaction only in the region wherein they depart from the circular shape. This pass-through 8 is smaller than half the cross-sectional area of the housing 1. Reaction-control members 70 mounted one behind the other are each mounted so as to displace the pass-through 8 by 180° so that a zigzag-shaped path 9 is formed for the reaction front.

The reaction front is redirected at each reaction-control member 70 whereby the path of the reaction front is lengthened compared to a generator without built-in reaction-control members. Furthermore, energy is withdrawn from the reaction front by means of the reaction-control members whereby the reaction speed is reduced. Both effects cause a drop of the oxygen flow and an increase of the duration of supply. The oxygen flow can be varied in wide limits and the time-dependent response can be adapted to a desired profile by means of the following: number of reaction-control members; spacing of the reaction-control members 70 with respect to each other; area of the pass-throughs 8; and, the structural configuration of the reaction-control members 70.

Figure 2A:
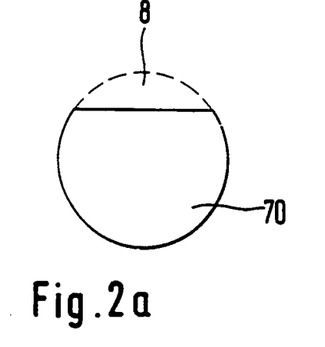
FIGS. 2a to 2f show various embodiments of the reaction-control members.
Figure 2B:
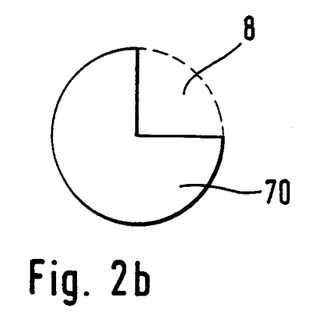
Figure 2C:
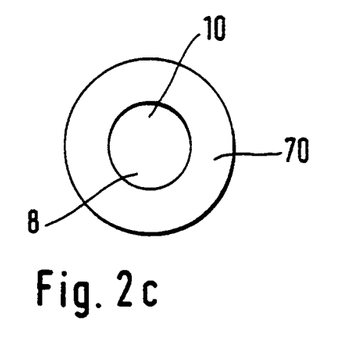
Figure 2D:
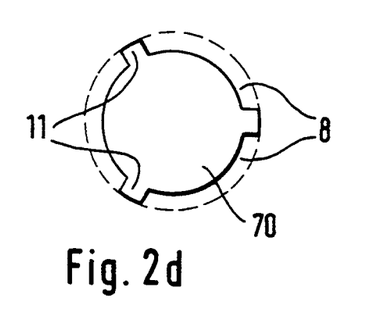
Figure 2E:
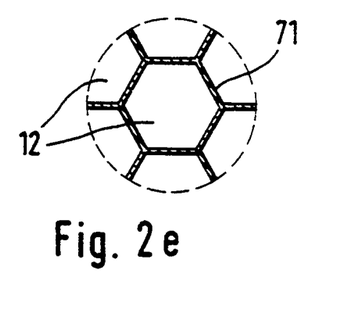
Figure 2F:
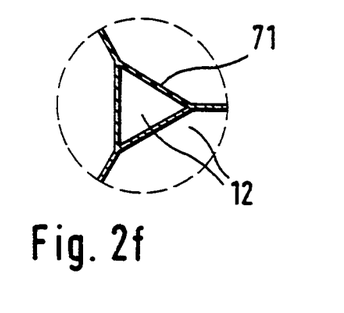

Various embodiments of the reaction-control members (70, 71) are shown in FIGS. 2a to 2f with the forms in FIGS. 2a to 2d being for embodiments wherein the reaction-control members are transverse to the direction of movement of the reaction front and forms in FIGS. 2e and 2f show embodiments wherein the reaction-control members extend parallelly to the direction of movement of the reaction front. The broken circular lines show in each case the disposition of the inner diameter of the housing 1. The pass-through 8 resulting thereby is in each case identified. The embodiments of FIGS. 2a and 2b show different circular sectors. Further embodiments having curved cutting lines and discs having holes near the edge are also possible configurations. The embodiment of FIG. 2c is a circular disc having a central hole 10 and the embodiment of FIG. 2d is a circular disc having a diameter less than the diameter of the housing 1 and is fixed by means of three lugs 11 in the housing 1. If the reaction-control members shown in FIGS. 2c and 2d alternate, then the reaction front runs alternately to the center and to the periphery of the housing 1.

The embodiments of FIGS. 2e and 2f are reaction-control members 71, shown in section, which are arranged parallelly to the direction of movement of the reaction front. The cross-sectional area of the housing 1 is subdivided by the reaction-control elements 71 into a plurality of chambers 12 in which the reaction front runs simultaneously. The reaction is slowed by the removal of energy. The extent of the removal of energy is influenced by the number and size of the chambers 12 formed and by the nature and thickness of the sheet metal of the reaction-control member 71.

Figure 3:
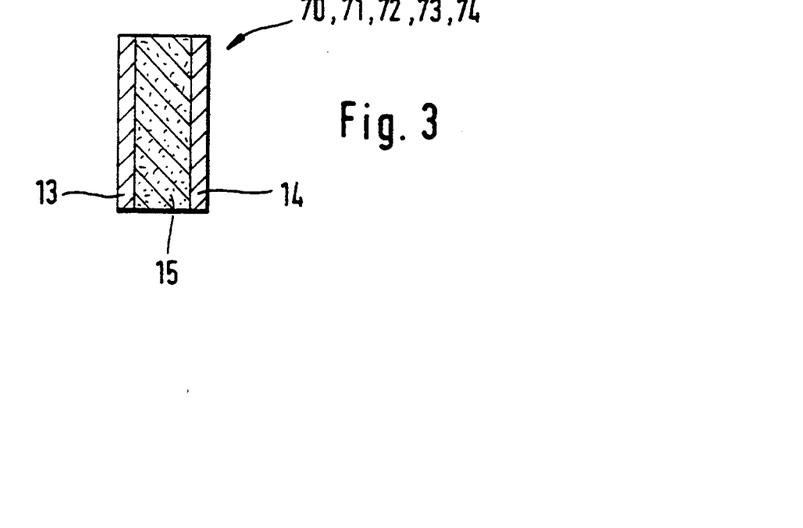
FIG. 3 is a side elevation view, in section, of a reaction-control member having a sandwich-like configuration.

FIG. 3 shows a reaction-control element (70, 71, 72, 73, 74) having a sandwich-like configuration. The reaction-control member of FIG. 3 comprises two good thermally-conducting layers (13, 14) in the form of sheet metal made of non-rusting steel and a thermally-insulating layer 15 disposed between the layers (13, 14) with the insulating layer 15 being in the form of a ceramic-fiber plate. When the reaction front comes closer, for example, from the left toward the reaction-control member (70 to 74), then the sheet metal 13 draws the heat away from the reaction front for becoming heated and in that the reaction-control member diverts the heat to the housing. The insulating layer 15 prevents a preheating of the chemical charge 2 (not shown) lying to the right of the reaction-control member (70 to 74). If the reaction front has penetrated to the right side of the reaction-control member (70 to 74), then the plate 14 again removes heat from the reaction front. The removal of heat can be influenced by the nature of the material of the sheets (13, 14) and their thickness.

Figure 4A:
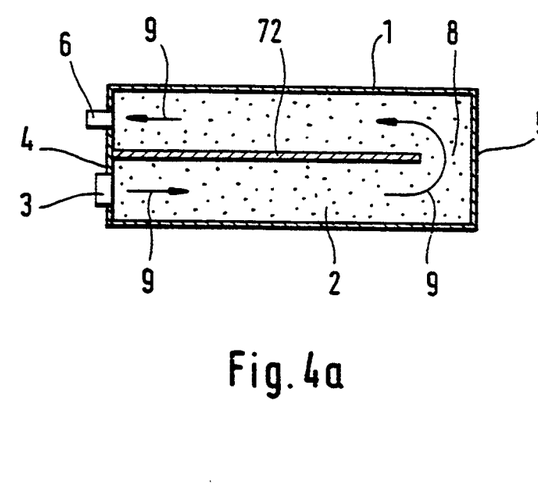
FIGS. 4a and 4b show is another embodiment of the chemical oxygen generator according to the invention wherein a reaction-control member is built into the generator so as to extend parallelly to the direction of movement of the reaction front.
Figure 4B:
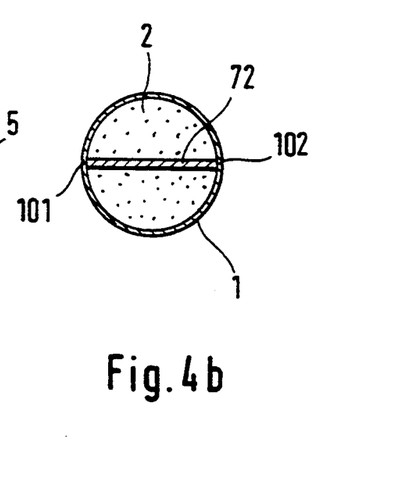

In FIG. 4a, a chemical oxygen generator is shown schematically in longitudinal section and FIG. 4b provides a cross section thereof. In this oxygen generator, a reaction-control member 72 is mounted and arranged parallelly to the direction of movement of the reaction front. The reaction-control member 72 extends transversely and in the center through the cross-sectional area of the generator housing 1 from a wall location 101 to the opposite-lying wall location 102 and extends along the axis of the generator from the ignition end 4 up to the region of the opposite-lying end 5. A pass-through 8 for the reaction front 9 is left clear at this end 5.

After the chemical charge 2 is ignited by the ignition device 3, the reaction front 9 runs along the one side of the reaction-control member 72 toward the end 5 of the generator and moves to the other side in the region of the pass-through 8 and runs on this side back to the oxygen outlet 6. A supply duration with a correspondingly reduced oxygen flow is provided which is more than double when compared to a generator without built-in reaction-control members. This is provided because of the U-shaped path of the reaction front 9 and the slowing of the reaction by means of the reaction-control member 72. The oxygen outlet 6 can also be arranged at the end 5 of the housing 1 which lies opposite the ignition device 3.

Figure 5:
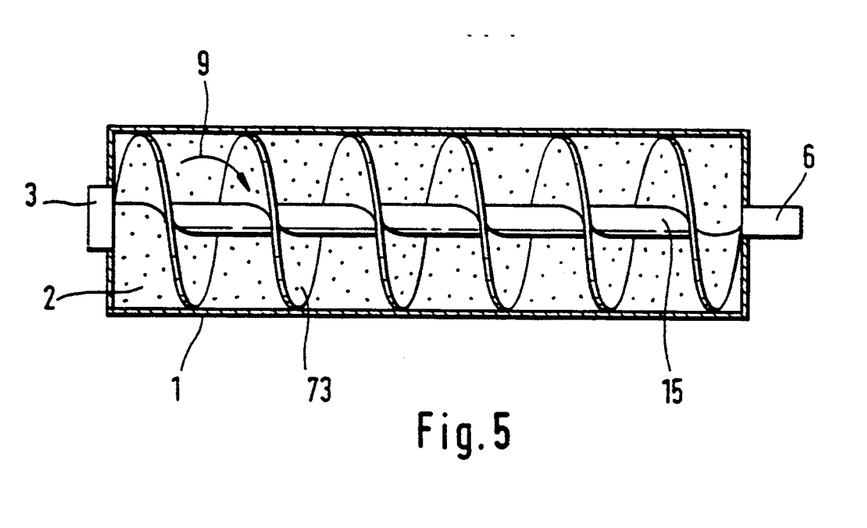
FIG. 5 is another embodiment of the chemical oxygen generator of the invention wherein the reaction-control member has a configuration corresponding to a spiral conveyor; and, FIGS. 6a and 6b show still another embodiment of the chemical oxygen generator of the invention wherein the reaction-control member has a spiral configuration.

FIG. 5 shows a generator, in section, wherein a reaction-control member 73 is mounted in the housing 1 within the chemical charge 2 with the reaction-control member being wound in the shape of a spiral conveyor 73. The reaction-control member extends radially from a closed core 15 to the wall of the housing 1 and axially from the ignition end of the housing 1 up to the opposite-lying end thereof on which the oxygen outlet 6 is arranged. After ignition by the ignition device 3, the reaction front 9 runs helically to the outlet 6. A greatly extended path of the reaction front 9 is obtained with a correspondingly lengthened duration of supply. The response of the oxygen flow can be adapted to a pre-given profile by means of a variable slope of the reaction-control member 73 along the path of the reaction front 9. The reaction-control member 73 must not be arranged along the entire length of the housing 1; instead, the reaction-control member can be arranged in one or more component regions wherein a slowing of the reaction is desired.

Figure 6A:
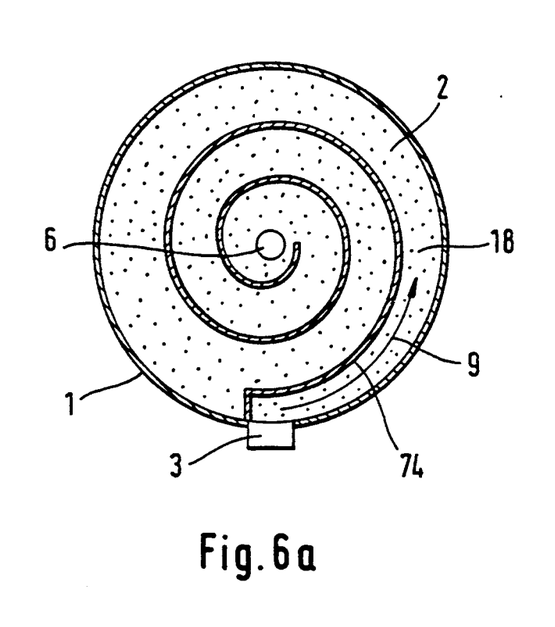
Figure 6B:
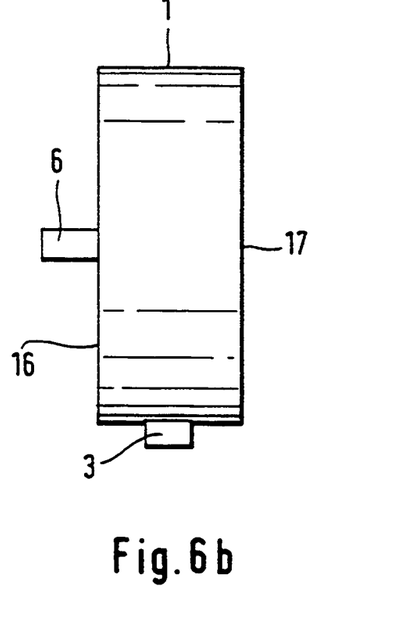

FIGS. 6a and 6b show still another embodiment of an oxygen generator having a housing 1 in the shape of a flat can. The reaction-control member is configured as a spirally-wound band 74 and extends from the base 16 to the cover 17 of the housing 1. The one end of the band is connected to the outer wall of the housing 1 and the other end lies in the vicinity of the center of the housing 1. The band 74 provides a spirally-wound channel 18 in the inner space of the housing 1 with the channel 18 being filled with the chemical charge 2. An oxygen outlet 6 is provided at the inner end of the channel 18 and an ignition device 3 is mounted at the outer end of this channel. The arrangement of the ignition device 3 and the oxygen outlet 6 can be exchanged. The reaction front 9 moves in the spirally-wound channel 18. The duration of supply is increased by the extended path of the reaction front 9 and by the removal of energy effected by the reaction-control member 74.

It is understood that the foregoing description is that of the preferred embodiments of the invention and that various changes and modifications may be made thereto without departing from the spirit and scope of the invention as defined in the appended claims.

What is claimed is:

1. A chemical oxygen generator for generating and releasing oxygen, the chemical oxygen generator comprising:

a housing having a housing wall defining an interior;

a chemical charge disposed in said interior and containing chemicals which release oxygen in an exothermal reaction when ignited;

said housing having an outlet formed in said housing wall for passing released oxygen from said interior;

ignition means for initiating the exothermal reaction so as to cause the exothermal reaction to travel as a reaction front through said chemical charge in a predetermined direction of movement;

said ignition means being disposed in said housing in spaced relationship to said outlet so as to place said chemical charge between said ignition means and said outlet wherein said chemical charge defines a path between said ignition means and said outlet along which said reaction front moves through said charge chemical;

a reaction-control wall mounted in said housing and extending from said housing wall partially into said chemical charge transversely to said predetermined direction of movement so as to alter said path and compel said reaction front to move around said reaction-control wall;

said path having a first path segment on one side of said reaction-control wall and a second path segment on the other side of said reaction-control wall;

a first portion of said chemical charge lying along said first path segment and a second portion of said chemical charge lying along said second path segment; and, said reaction-control wall having a sandwich configuration including a thermally-insulating layer for preventing heat from being conducted from said first portion of said chemical charge into said second portion of said chemical charge lying on said other side of said reaction-control wall thereby slowing the reaction through said housing and a thermally-conducting layer sandwiched to said thermally-insulating layer, said thermally-conducting layer being connected directly to said housing and facing one of said path segments for absorbing heat away from the reaction as said reaction front moves along said one path segment while at the same time conducting the absorbed heat to said housing wall and through said housing wall to the ambient thereby further slowing the reaction through said housing.

2. The chemical oxygen generator of claim 1, said reaction-control wall including two of said thermally-conducting layers; and, said thermally-insulating layer being sandwiched between said two thermally-conducting layers.

3. The chemical oxygen generator of claim 2, said two thermally-conducting layers being two layers of sheet metal.

4. The chemical oxygen generator of claim 3, said thermally-insulated layer being made of a substance selected from the group consisting of glass, ceramic, a mineral material, nonwoven formed fabric, a fiber plate and a foamed body.

5. The chemical oxygen generator of claim 1, further comprising a plurality of said reaction-control walls mounted in said housing and being arranged in said chemical charge so as to be perpendicular to said predetermined direction; and, each of said reaction-control walls overlapping approximately 50% to 90% of said reaction front.

6. The chemical oxygen generator of claim 5, said reaction-control walls being mounted in said housing and arranged in said chemical charge so as to cause said path to be a zigzag path through said housing.

7. A chemical oxygen generator for generating and releasing oxygen, the chemical oxygen generator comprising:

a housing having a housing wall defining an interior;
a chemical charge disposed in said interior and containing chemicals which release oxygen in an exothermal reaction when ignited;
said housing having an outlet formed in said housing wall for passing released oxygen from said interior;
ignition means for initiating the exothermal reaction so as to cause the exothermal reaction to travel as a reaction front through said chemical charge in a predetermined direction of movement;
said ignition means being disposed in said housing in spaced relationship to said outlet so as to place said chemical charge between said ignition means and said outlet wherein said chemical charge defines a path between said ignition means and said outlet along which said reaction front moves through said chemical charge;
a reaction-control wall mounted in said housing and extending from said housing wall partially into said chemical charge parallelly to said predetermined direction of movement so as to alter said path and compel said reaction front to move around said reaction-control wall;
said path having a first path segment on one side of said reaction-control wall and a second path segment on the other side of said reaction-control wall;
a first portion of said chemical charge lying along said first path segment and a second portion of said chemical charge lying along said second path segment; and,
said reaction-control wall having a sandwich configuration including a thermally-insulating layer for preventing heat from being conducted from said first portion of said element charge into said second portion of said chemical charge lying on said other side of said reaction-control wall thereby slowing the reaction through said housing and a thermally-conducted layer sandwiched to said thermally-insulating layer, said thermally-conducting layer being connected direction to said housing and facing one of said path segments for absorbing heat away from the reaction as said reaction front moves along said one segment while at the same time conducting the absorbed heat to said housing wall and through said housing wall to the ambient thereby further slowing the reaction through said housing.

8. The chemical oxygen generator of claim 7, said reaction-control member including two of said thermally-conducting layers; and, said thermally-insulating layers being sandwiched between said two thermally-conducting layers.

9. The chemical oxygen generator of claim 8, said two thermally-conducting layers being two layers of sheet metal.

10. The chemical oxygen generator of claim 9, said thermally-insulating layer being made of a substance selected from the group consisting of glass, ceramic, a mineral material, nonwoven formed fabric, a fiber plate and a foamed body.

11. The chemical oxygen generator of claim 7, further comprising a plurality of said reaction-control walls mounted in said housing and being arranged in said chemical charge so as to be parallel to said predetermined direction.

12. The chemical oxygen generator of claim 7, said wall housing having first and second end walls and said ignition means being mounted on said first end wall; said second end wall lying opposite and spaced from said first end wall; said reaction-control wall being mounted in said housing so as to extend from said first end wall parallelly to said predetermined direction up to within the proximity of said second end wall so as to define a space between said second end wall and said reaction-control wall; and, said housing wall including a side wall connecting said end walls to each other and extending parallelly to said reaction-control wall; said end walls and said side wall conjointly defining said interior of said housing; said side wall having opposite lying wall segments extending parallelly to said direction of movement; and, said reaction-control wall extending across said interior between said wall segments so as to cause said housing wall and said reaction-control wall to conjointly define a U-shaped path in said interior along which said reaction front travels through said housing.

13. The chemical oxygen generator of claim 7, said housing having a predetermined length; said housing wall having first and second end walls and a side wall connecting said end walls and defining said length of said housing; said end walls and said side wall conjointly defining said interior of said housing; said housing defining a longitudinal axis concentric with said side wall; said ignition means being mounted on said first end wall; said housing including a closed core disposed in said interior along said longitudinal axis; and, said reaction-control wall being configured as a blade of a spiral conveyor extending radially from said core to said side wall along at least a portion of said length of said housing.

14. The chemical oxygen generator of claim 7, said housing being configured as a can having a longitudinal center axis, said housing having top and bottom walls perpendicular to said axis and a side wall interconnecting said top and bottom walls; said reaction-control wall being a spirally wound band having a width extending between said top and bottom walls; said band having a first end within the proximity of said longitudinally center axis and a second end connected to said side wall; said band and said top and bottom walls conjointly defining a spiral channel having respective channel ends at said first and second ends of said band; said ignition means being mounted at one of said channel ends; and, said outlet of said housing being formed at the other one of said channel ends for conducting the oxygen generated by said exothermal reaction out of said housing.

* * * * *

UNITED STATES PATENT AND TRADEMARK OFFICE
CERTIFICATE OF CORRECTION

PATENT NO. : 5,336,470

DATED : August 9, 1994

INVENTOR(S) : Hans-Christoph Bechthold, Udo Burchardt, Rainer Ernst and Karsten Vogeler It is certified that error appears in the above-identified patent and that said Letters Patent is hereby corrected as shown below:

In column 1, line 19: delete " time" and substitute -- the -- therefor.

In column 3, line 57: delete "is".

In column 6, line 49: delete "charge chemical" and substitute -- chemical charge -- therefor.

In column 7, line 22: delete "insulated" and substitute -- insulating -- therefor.

In column 8, line 6: delete "element" and substitute -- chemical -- therefor.

In column 8, line 10: delete "conducted" and substitute -- conducting -- therefor.

In column 8, line 12: delete "direction" and substitute -- directly -- therefor.

In column 8, line 39: delete "wall housing" and substitute -- housing wall -- therefor.

UNITED STATES PATENT AND TRADEMARK OFFICE
CERTIFICATE OF CORRECTION

PATENT NO. : 5,336,470

DATED : August 9, 1994

INVENTOR(S) : Hans-Christoph Bechthold, Udo Burchardt, Rainer Ernst and Karsten Vogeler It is certified that error appears in the above-identified patent and that said Letters Patent is hereby corrected as shown below:

In column 10, line 1: delete " longitudinally" and substitute -- longitudinal -- therefor.

Signed and Sealed this

Twenty-seventh Day of December, 1994

Attest:

BRUCE LEHMAN

*Attesting Officer*  *Commissioner of Patents and Trademarks*